US006628252B2

(12) United States Patent
Hoshino et al.

(10) Patent No.: US 6,628,252 B2
(45) Date of Patent: Sep. 30, 2003

(54) LED DRIVE CIRCUIT

(75) Inventors: Taichi Hoshino, Kyoto (JP); Isao Ouchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 297 days.

(21) Appl. No.: 09/851,094

(22) Filed: May 9, 2001

(65) Prior Publication Data

US 2001/0043113 A1 Nov. 22, 2001

(30) Foreign Application Priority Data

May 12, 2000 (JP) ........................................ 2000-140780
Mar. 27, 2001 (JP) ........................................ 2001-089890

(51) Int. Cl.[7] ............................................... H05B 37/02
(52) U.S. Cl. ............................. 345/82; 345/39; 345/46; 345/83; 345/84; 345/204; 315/170; 315/185; 315/193; 362/800
(58) Field of Search ............................. 345/39, 46, 82, 345/83, 84, 204; 315/170, 185, 193; 362/800

(56) References Cited

U.S. PATENT DOCUMENTS 3,925,690 A * 12/1975 Spence ........................ 326/83
5,442,260 A * 8/1995 Saito et al. ............... 315/241 P
5,912,568 A * 6/1999 Kiley .......................... 327/108
6,362,578 B1 * 3/2002 Swanson et al. ............. 315/307
6,400,101 B1 * 6/2002 Biebl et al. .................. 315/291

FOREIGN PATENT DOCUMENTS

| JP | 3-129884 | 6/1991 |
| JP | 5-27789 | 4/1993 |
| JP | 11-305198 | 11/1999 |

* cited by examiner

Primary Examiner—Bipin Shalwala
Assistant Examiner—Vincent E. Kovalick
(74) Attorney, Agent, or Firm—Mattingly, Stanger & Malur, P.C.

(57) ABSTRACT

An LED drive circuit includes a booster circuit having a first and second capacitors and using a n/m voltage type rectifying switching and a constant current circuit having a MOS transistor as an output transistor. The constant current circuit is connected in series with an LED as a load of the booster circuit to drive the LED with constant current. With this circuit construction, there is substantially no electromagnetic noise generated and it is possible to maintain a terminal voltage of the LED substantially constant according to the diode characteristics of the LED even when voltage ripple appears in an output of the booster circuit due to the n/m voltage boost, by setting the switching frequency at high to absorb the ripple component on the side of the constant current circuit.

11 Claims, 7 Drawing Sheets

LED DRIVE CIRCUIT

BACKGROUND OF THE INVENTION

1. Field of the Invention

The present invention relates to a drive circuit for driving at least one LED (Light Emitting Diode) as an illumination element of a display device used in a portable electronic device and, particularly, to an LED drive circuit for driving at least one LED as an illumination element of a battery driven, LCD (Liquid Crystal Display) device mounted on a portable electronic device such as a portable telephone set of PHS (Personal Handyphone System) or portable telephone system, an electronic book or a PDA. The LED drive circuit is capable of easily driving an LED having high forward voltage drop Vf, is compact and low power consumption, has a small variation of luminance and is capable of restricting change of luminance even when the battery voltage is lowered.

2. Description of Related Art

As a source of illumination light such as a back light or side light for a display device of a battery driven electronic device such as a portable telephone set of such as PHS or portable telephone system or a portable electronic device, LED has been used.

A drive circuit for LED generates a LED drive voltage by boosting a battery voltage by a booster circuit such as a charge pump circuit utilizing a voltage doubler and by regulating the boosted voltage to a constant voltage by means of a voltage regulator.

FIG. 6 is a circuit diagram of one of examples of a conventional LED drive circuit.

In the LED drive circuit shown in FIG. 6, a charge pump circuit 12 adds an output voltage of a lithium battery 11 in a range from 3.0V to 4.2V, for example, 3.6V, to a capacitor C1 charged to the output voltage of the lithium battery 11, by on-off switching the output voltage of the lithium battery 11 at a predetermined frequency. An output voltage of the charge pump circuit 12, which is about 7.2V substantially twice the output voltage of the lithium battery 11, is applied to a capacitor C2 to charge the latter. The voltage of the capacitor C2 is regulated to a constant voltage, for example, 5V, by a voltage regulator 13.

The voltage regulator 13 regulates the voltage of the capacitor C2 by a voltage drop transistor thereof to generate a stabilized voltage of 5V and a power charging capacitor Co is charged by the stable voltage of 5V. A series circuit including a resistor R and an LED 15 is connected between an output terminal 14 of the voltage regulator 13 and ground so that the LED 15 is driven by the stabilized voltage through the resistor R.

In this case, a drive current Io becomes Io=(5−Vf)/R, where R is a resistance value of the resistor R and Vf is a terminal voltage of the LED 15 when it is driven.

In such LED drive circuit, however, luminance of an LED tends to vary. Particularly, the terminal voltage Vf of a white light emitting LED used as a back light of an LCD, a blue light emitting LED or a green light emitting LED is as high as about 3.5V in average and the terminal voltage Vf itself varies. Therefore, luminance of a driven LED may be low or there may be LED which can not emit light.

FIG. 7(a) shows a white LED drive voltage (forward terminal voltage Vf) vs. drive current (forward current Ifp) characteristics of the white LED and FIG. 7(b) shows a relative luminous intensity vs. drive current (forward current Ifp) characteristics thereof.

A variation of the drive voltage vs. drive current characteristics shown by a double arrow in FIG. 7(a) may be restricted by using a variable resistor as the resistor R (FIG. 6) and regulating a resistance value thereof. However, it requires a resistance regulation step, additionally. Further, in a case where the voltage regulator 13 is used, the power charging capacitor Co having capacitance as large as several μF~ten and several μF must be used. Even if a chip capacitor is used as the power capacitor Co, a problem occurs in reducing the size and weight of a portable telephone set of PHS or portable telephone system.

Further, when a voltage regulator utilizing a voltage drop transistor is used, power consumption is increased and, further, a size of the power circuit for a portable electronic device becomes large. In order to avoid these problems, there is an LED drive circuit in which a voltage is boosted by using a switching power circuit.

However, the switching power circuit requires an inductance element, so that electromagnetic noise tends to occur and a countermeasure against such noise must be employed in the switching power circuit itself and/or other circuits. Further, an inductance of a coil used as the inductance element must be 100 μH~several hundreds μH, whose size may be at least 5 mm×5 mm. As a result, the inductance element also becomes problem in reducing the size and weight of a portable telephone set of PHS or portable telephone system.

On the other hand, JP H11-305198A discloses a technique for maintaining a luminance of an LED constant when the LED is used as a back light of an LCD. In this technique, a constant current circuit is provided to drive the LED with a constant current. Further, JU H5-27789A discloses a technique similar to that disclosed in JP H11-305198A. Further, JP H3-129884A discloses a technique in which an LED is used as a direct display element and is driven by a charge pump circuit. However, a constant current driving is not employed in the latter prior art.

It can be said that these LED drive circuit techniques disclosed in the above-mentioned prior arts can not be used in a device having a compact and light-weight casing of such as a portable telephone set. The reason for this is that a reference voltage is generated by a series circuit of a Zener diode and a MOS transistor. Since, in such circuit, an operating voltage of a constant current circuit becomes high and it is impossible to maintain a luminance of emitted light constant in a wide range of an output voltage characteristics of the battery, which shows a gradual reduction of output voltage with use of the battery. Further, since the constant current drive using a bipolar transistor is employed and the driving constant current varies with variation of temperature, luminance of LED varies when temperature of the compact and lightweight casing of the portable telephone set rises. Such variation of luminance of LED may become modest to some extent in the circuit disclosed in JP H11-305198A in which a number of LED's provided by a plurality of parallel connected series circuits each including four series connected LED's are driven simultaneously. However, in a low power consumption back light illuminating circuit using 2 to 6 LED's, such variation of luminance becomes a problem.

In order to elongate a battery life of an electronic device such as a portable telephone set, it is usual that a power consumption of the electronic device is reduced by reducing a display luminance of an LCD thereof in night time relative to luminance in day time. When luminance of LED is regulated in such manner, it is necessary to regulate a drive current of the LED. Therefore, a drive current regulator circuit must be provided separately, causing a circuit size to be increased. The provision of such drive current regulator circuit becomes obstacles in giving multifunction to the electronic device, in reducing the size and weight of the electronic device and in integrating the circuits.

SUMMARY OF THE INVENTION

An object of the present invention is to provide a compact LED drive circuit for driving an LED for use to illuminate a display device of a portable electronic device, which is capable of easily driving the LED having high terminal voltage Vf with small power consumption and of restricting a variation of luminance of the LED even when an output voltage of a battery thereof is reduced.

In order to achieve the above object, a drive circuit for an LED for use to illuminate a display device of a portable electronic device according to the present invention is featured by comprising a battery power source, a booster circuit for boosting an output voltage of the battery power source by charging a first capacitor with the output voltage of the battery power source by switching the latter at a predetermined frequency, charging a second capacitor by boosting the voltage of the first capacitor to substantially n/m times by an on-off switching, which is complement to the switching of the output voltage of the battery power source, where n and m are integers equal to or larger than 2, respectively, and n>m, at least one LED connected to an output terminal of the booster circuit as a load and a constant current circuit connected to said LED, for driving the LED with a constant current, the constant current circuit including a MOS transistor and means for generating the constant current by controlling the MOS transistor by comparing a predetermined reference voltage with a voltage according to a drive current of the LED.

In the construction of the LED drive circuit mentioned above, the booster circuit having a first and second capacitors and using a n/m voltage type rectifying switching is used and the constant current circuit having the MOS transistor as the output transistor is connected in series with the LED as a load of the booster circuit to drive the LED with constant current. With this circuit construction, there is substantially no electromagnetic noise generated and it is possible to maintain a terminal voltage of the LED substantially constant according to the diode characteristics of the LED even when voltage ripple appears in an output of the booster circuit due to the n/m voltage boost, by setting the switching frequency at high to absorb the ripple component on the side of the constant current circuit. Since the ripple component is absorbed on the side of the constant current circuit, the LED is driven with substantial constant current and constant voltage and variation of luminance of the LED is restricted.

Further, the operating voltage of the constant current circuit having the MOS transistor in its output stage is as low as 1V or less. Therefore, a voltage across a voltage detecting resistor inserted in series therewith can be made several hundreds mV or less, so that it is possible to maintain substantially constant luminance characteristics in a wide range of the voltage drop characteristics of the battery.

As a result, a large power capacitor becomes unnecessary and a voltage regulator is also unnecessary. Therefore, it becomes possible to realize an LED drive circuit, which has a restricted power consumption, restricted luminance variation of LED's and is suitable for use in a compact device.

DETAILED DESCRIPTION OF THE PREFERRED EMBODIMENTS

Figure 1:
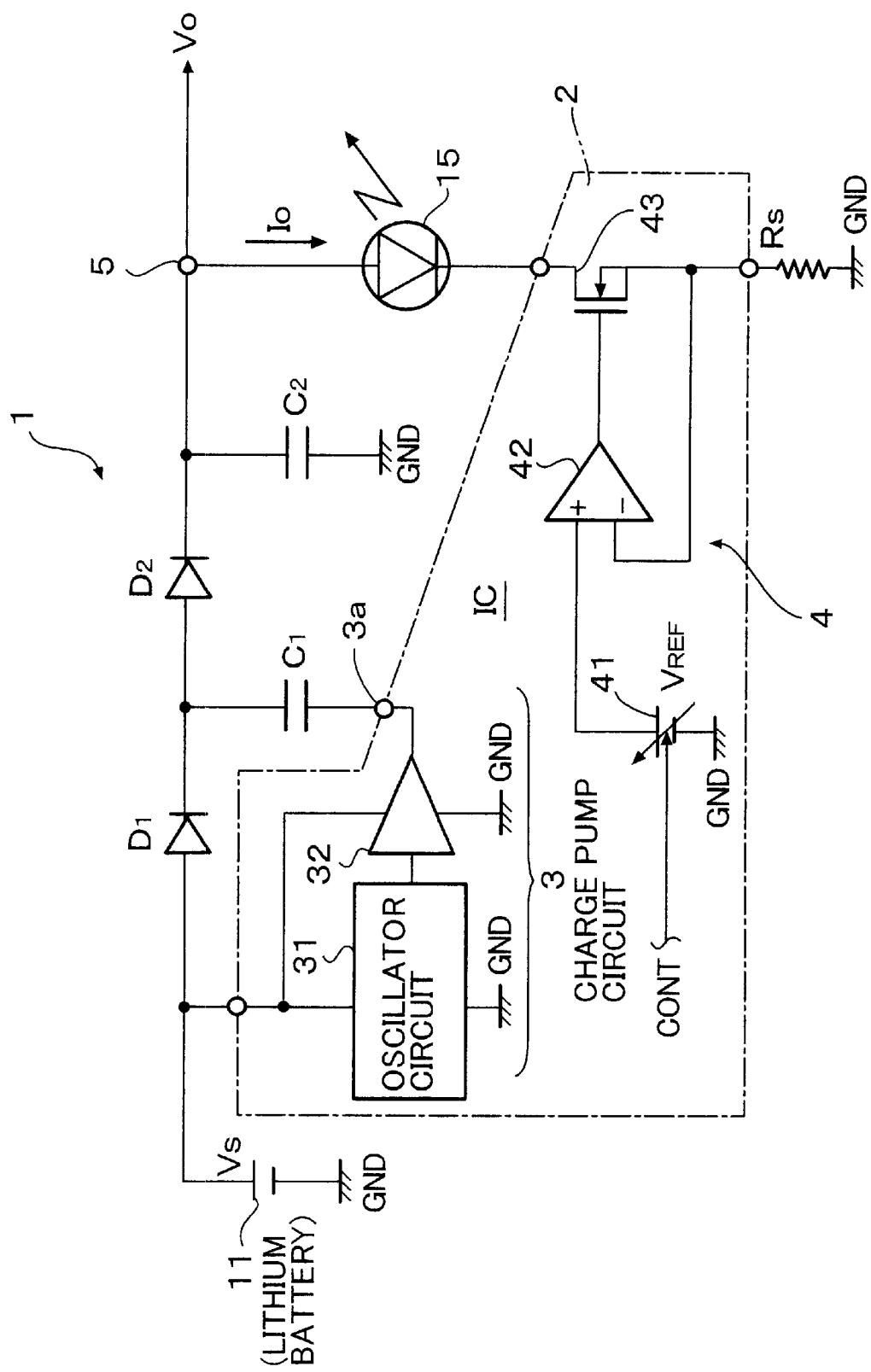
FIG. 1 is a circuit diagram of an LED drive circuit according to an embodiment of the present invention.

In FIG. 1, an LED drive circuit 1 used in a display device of a portable telephone set, which is driven by a lithium battery 11 includes a booster IC circuit 2, which formed as an IC as shown by a chain line. The booster circuit has the booster IC circuit 2, diodes D1 and D2, and capacitors C1 and C2. The booster IC circuit 2 is composed of a charge pump circuit 3 and a constant current drive circuit 4. A series circuit of forward connected diodes D1 and D2 is provided between a positive terminal of the lithium battery 11 and an output terminal 5 of the LED drive circuit 1.

It should be noted that same constructive circuit elements in FIG. 1 to FIG. 6 are depicted by same reference numerals, respectively, and portions thereof surrounded by chain lines are formed as IC's, respectively.

A capacitor C1 is connected between a junction of a cathode of the diode D1 and an anode of the diode D2 and an output terminal 3a of the charge pump circuit 3 and a capacitor C2 is connected between a cathode of the diode D2 and ground. The output terminal 5 of the LED drive circuit is connected to a white LED 15 and the constant current drive circuit 4 is provided in a downstream side of the LED 15. A constant drive current of the LED 15 is sunk through the constant current drive circuit 4.

In this embodiment, the capacitors C1 and C2 are ceramic capacitors having capacitances of about 1 $\mu$F, respectively, and the diodes D1 and D2 are Schottky diodes having small forward voltage drop.

The charge pump circuit 3 of the booster IC circuit 2 is composed of an oscillator circuit 31 and a driver 32, which are driven by the lithium battery 11. The oscillator circuit 31 takes in the form of a ring oscillator and generates a pulse signal having a frequency in a range from 100 kHz to 700 kHz and a duty cycle of 50%. The driver 32 responds to the pulse signal from the oscillator 31 to generate a pulse signal switching between a high level (H) which is equal to the voltage of the lithium battery and a low level (L) which is ground level at the output terminal 3a. The pulse signal at the output terminal 3a is supplied to the capacitor C1.

The constant current drive circuit 4 is composed of a luminance regulator circuit 41, a differential amplifier 42, an N channel MOS FET 43 as an output stage and a resistor Rs connected between a source of the transistor 43 and ground for detecting a drive current.

A (+) input of the differential amplifier 42 is connected to the luminance regulator circuit 41 and a (−) input of the differential amplifier 42 is connected to the source side of the transistor 43. An output terminal of the differential amplifier 42 is connected to a gate of the transistor 43. The source of the transistor 43 is grounded through the resistor Rs.

A drain of the transistor 43 in the output stage of the constant current drive circuit 4 for driving the LED 15 with constant current is connected to the LED 15. The transistor 43 functions to sink the drive current flowing through the LED 15 by grounding it through the source thereof and the resistor Rs. The drive current Io flowing through the LED 15 becomes constant by controlling the terminal voltage of the resistor Rs becomes coincident with a voltage set by the luminance regulator circuit 41. The resistor Rs is a current detecting resistor of a drive current of the LED and the terminal voltage of the resistor Rs is a detecting voltage according to a drive current of the LED. A value of the constant current Io is determined by the voltage of the luminance regulator circuit 41. Therefore, it is possible to regulate the drive current and hence the luminance of the LED by regulating an output voltage of the luminance regulator circuit 41 by external manual operation of a variable resistor thereof directly or indirect operation thereof through a control signal CONT supplied from a controller.

In this embodiment, the terminal voltage of the resistor Rs is usually regulated to a value not higher than 1V, preferably, within a range from 100 mV to 300 mV. Further, it is possible to restrict the output voltage of the constant current drive circuit 4, which varies correspondingly to a voltage ripple at the output terminal 5, to about 1V in average. As a result, there is a margin of 1V or more provided with respect to the lighting voltage Vf of the LED 15, so that it is possible to maintain substantially constant luminance characteristics of the LED within a wide range of the voltage characteristics of the battery 11, which shows a gradual reduction.

In this embodiment, the luminance regulator circuit 41 takes in the form of a reference voltage generator circuit for generating a reference voltage for comparison to set the constant current of the constant current drive circuit 4. Further, the output voltage of the luminance regulator circuit 41 may be set by the control signal CONT from a microcomputer.

Now, an operation of the whole LED drive circuit 1 will be described.

Assuming that the output voltage of the lithium battery 11 is depicted by Vs and the forward voltage drops of the diodes D1 and D2 are negligible, the diode D1 becomes ON during an OFF state of the output pulse of the driver 32, that is, a state in which the level of the output pulse of the driver is L, so that the capacitor C1 is charged through the diode D1. In a next ON period in which the output pulse of the driver 32 becomes H, the diode D2 is turned ON and the voltage of the capacitor C1 is increased to 2 Vs. Therefore, the capacitor C2 is charged to this voltage through the diode D2.

As a result, the voltage 2 Vs of the capacitor C2 appears at the output terminal 5.

So long as the voltage of the capacitor C2 is equal to or higher than Vs, the diode D2 is in OFF state during the OFF period in which the output pulse of the driver 32 is L, so that the capacitor C2 is not charged during this OFF period. The diode D1 becomes OFF in the ON period in which the output pulse becomes H. The diodes D1 and D2 are ON/OFF switched by the output pulse of the driver 32 as mentioned above.

The voltage boosted to 2 Vs is converted to a constant current by the constant current drive circuit 4 and the constant current flows through the LED 15. In this case, the voltage applied to the LED 15 is modulated at a certain frequency within a range from 100 kHz to 700 kHz, which is the oscillation frequency range of the oscillator circuit 31. However, the voltage across the LED 15 is maintained at a constant value corresponding to the drive current according to its diode characteristics. Therefore, a voltage regulator circuit required in the conventional LED drive circuit becomes unnecessary and the drive voltage of the LED 14 does not vary even when the voltage Vo at the output terminal 5 of the LED drive circuit is different every device and even when the output voltage varies, so that the variation of luminance of the LED is restricted. Further, the voltage modulation at the frequency in the range from 100 kHz to 700 kHz does not appear as substantial flicker of light from the LED 15.

The variation of the voltage Vo at the output terminal 5 of the drive circuit is absorbed by a drain?source voltage of the transistor 43. This operation corresponds to that of the conventional voltage regulator.

Figure 2:
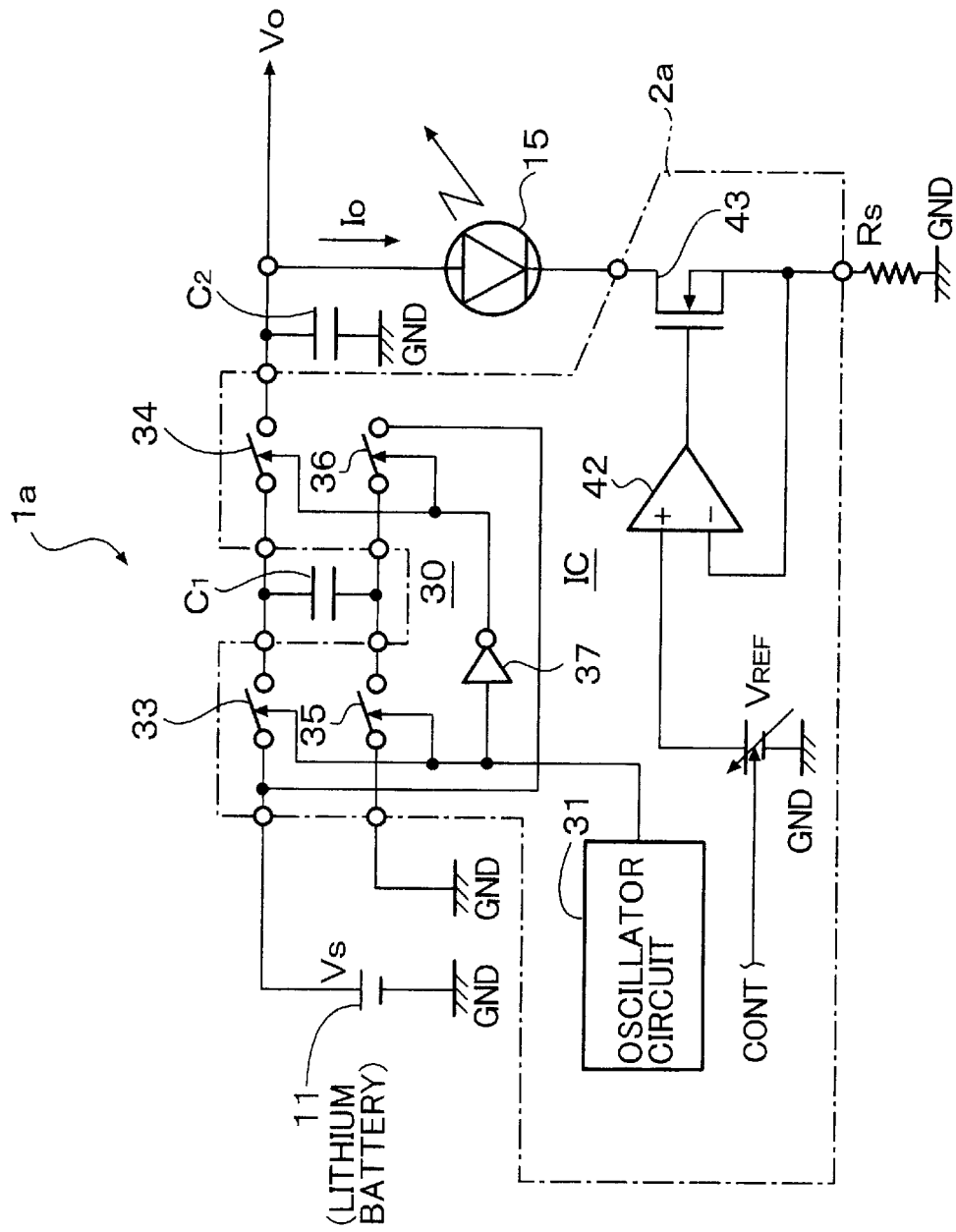
FIG. 2 is a circuit diagram of an LED drive circuit according to another embodiment of the present invention.

FIG. 2 is a circuit diagram of an LED drive circuit 1*a* according to another embodiment of the present invention, which differs from the LED drive circuit shown in FIG. 1 in that a charge pump circuit 30 utilizing a switch circuit of a MOS transistor is used in lieu of the charge pump circuit 3. A booster IC circuit 2*a* in shown in FIG. 2 is formed as an IC.

Further, in lieu of the diodes D1 and D2 and the driver 32 of the embodiment shown in FIG. 1, analog switch circuits (transfer gates) 33, 34, 35 and 36 using MOS transistors are provided. Incidentally, since the driver 32 shown in FIG. 1 is provided on demand, the driver 32 is omitted in FIG. 2. This is also true for embodiments shown in FIG. 3 to FIG. 5.

The switch circuits 33 and 34 are connected in series and positioned in lieu of the series connected diodes D1 and D2 shown in FIG. 1. The switch circuits 35 and 36 are connected in series and the series connected switch circuits 35 and 36 are provided in parallel to the series connected switch circuits 33 and 34. The capacitor C1 is connected between a junction of the switch circuits 33 and 34 and a junction of the switch circuits 35 and 36. One end of the series connected switch circuits 35 and 36 is grounded and the other end is connected to the positive terminal of the lithium battery 11.

The switch circuits 33 to 36 are ON/OFF controlled by the output pulse of the oscillator circuit 31. The switch circuit 33 is driven by the output pulse of the oscillator circuit 31 and the switch circuit 34 is driven by the output pulse through an inverter 37. Therefore, the switch circuits 33 and 34 are operated complementarily such that, when the output pulse is H, the switch circuits 33 and 34 are in the ON and OFF states, respectively, and, when the output pulse is L, the switch circuits 33 and 34 are in OFF and ON states, respectively. On the other hand, the switch circuit 35 is driven by the output pulse of the oscillator circuit 31 and the switch circuit 36 is driven by the output pulse of the oscillator circuit 31 through the inverter 37. Therefore, the switch circuits 35 and 36 are operated complementarily such that, when the output pulse is H, the switch circuit 35 is ON and the switch circuit 36 is OFF and, when the output pulse is L, the switch circuit 35 is OFF and the switch circuit 36 is ON.

The capacitor C1 is charged to the voltage Vs of the battery 11 through the switch circuits 33 and 35 during the period in which the output pulse of the oscillator circuit 31 is H. When the output pulse of the oscillator circuit 31 is L, the voltage of the capacitor C1 is increased up to 2 Vs through the switch circuit 36 and the voltage of 2 Vs is transferred to the capacitor C2 through the switch circuit 34 and charges the capacitor C2 to 2 Vs.

Other construction and operation of the circuit shown in FIG. 2 than mentioned above is similar to that shown in FIG. 1.

Figure 3:
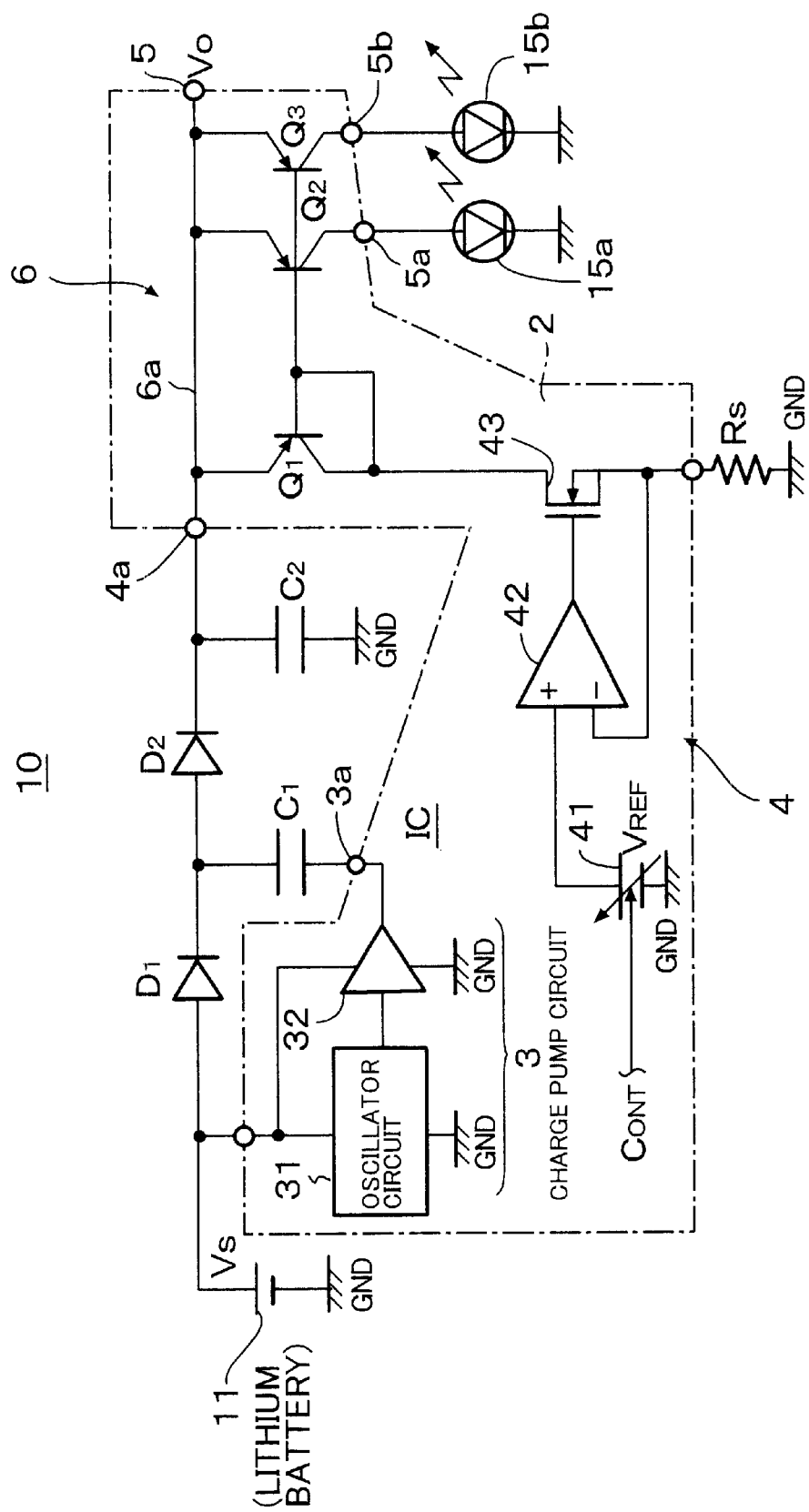
FIG. 3 is a circuit diagram of a constant current source type LED drive circuit according to another embodiment of the present invention.

FIG. 3 shows a circuit construction of an LED drive circuit 10 according to another embodiment of the present invention. This embodiment differs from the embodiment shown in FIG. 1 in that, in lieu of the LED 15 shown in FIG. 1, a current mirror circuit 6 is provided in a downstream of the constant current drive circuit 4 and integrated therewith. A contact current is generated by the current mirror circuit 6 to drive two LED's 15a and 15b.

The current mirror circuit 6 is composed of a PNP transistor Q1 and PNP transistors Q2 and Q3, which are connected in current mirror to the transistor Q1. Collectors of the transistors Q2 and Q3 are connected to terminals 5a and 5b of the IC, respectively, and the LED's 15a and 15b are connected between the terminals 5a and 5b and ground, respectively.

Emitters of the transistors Q1, Q2 and Q3 are connected to a line 6a connected between a terminal 4a of the IC, which is connected to the output side of the capacitor C2 and an output terminal 5. The collector of the transistor Q1 is connected to a drain of a transistor 43 so that the transistor Q1 is driven by constant current from the transistor 43. The terminal 4a and the output terminal 5 may be used concurrently.

Other construction than that mentioned above is similar to that shown in FIG. 1. In this embodiment, the constant current generated by the transistor 43 is inverted by the current mirror circuit 6 and supplied to the LED's 15a and 15b through the collectors of the transistors Q2 and Q3, respectively.

Figure 4:
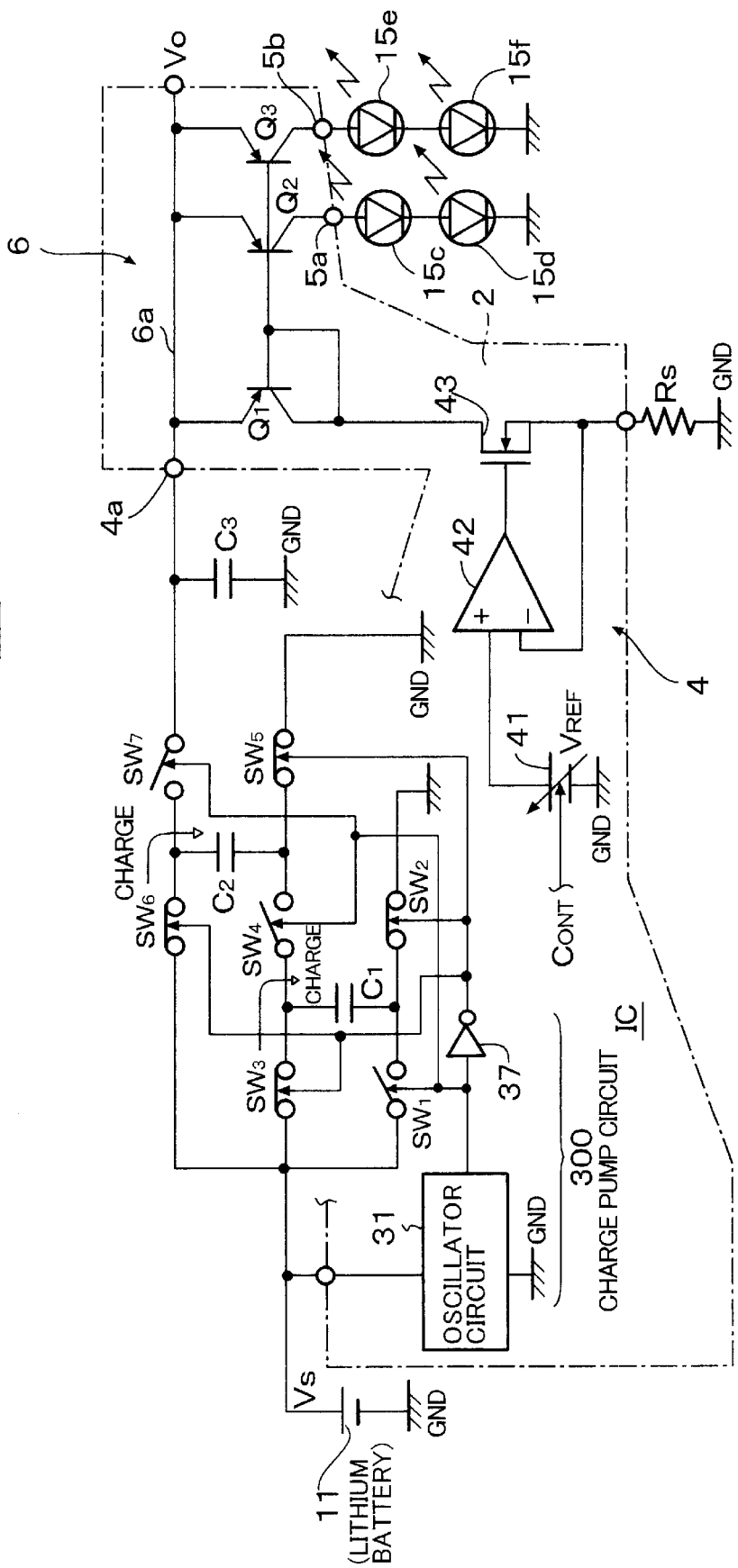
FIG. 4 is a circuit diagram of a constant current source type LED drive circuit according to another embodiment of the present invention, in which a battery voltage is boosted 3 times.

FIG. 4 is a circuit diagram of an LED drive circuit 10a according to a fourth embodiment of the present invention. The LED drive circuit 10a shown in FIG. 4 differs from the second embodiment shown in FIG. 2 in that a charge pump circuit 300 for boosting an input voltage to a voltage, which is three times the input voltage is used in lieu of the charge pump circuit 30 and a current mirror circuit 6 identical to the current mirror circuit 6 of the third embodiment shown in FIG. 3 is used as a circuit for driving the LED's with constant current.

In view of the fact that the voltage is boosted three times, a capacitor C3 is inserted into between a terminal 4a and ground as an output capacitor.

In the fourth embodiment, the drive voltage of the LED becomes three times due to the use of the charge pump circuit 300, so that series connected two LED's can be driven simultaneously. In lieu of the LED 15a shown in FIG. 3, series connected LED's 15c and 15d are connected between a terminal 5a and ground and, in lieu of the LED 15b, series connected LED's 15e and 15f are connected between a terminal 5b and ground.

A portion of the chain line defining the IC portion is omitted for the charge pump circuit 300.

The charge pump circuit 300 includes seven switch circuits SW1 to SW7 for charging three capacitors C1 to C3. When an output pulse of an oscillator circuit 31 is L, the switch circuits SW2, SW3, SW5 and SW6 are ON and the switch circuits SW1, SW4 and SW7 are OFF, so that the capacitors C1 and C2 are connected in parallel and charged by a lithium battery 11. In a period in which the output pulse of the oscillator circuit 31 is H, the switch circuits SW2, SW3, SW5 and SW6 are OFF and the switch circuits SW1, SW4 and SW7 are ON, so that the capacitors C1 and C2 are connected in series with the battery 11 and a voltage, which is three times the battery voltage, is generated and transferred to the capacitor C3.

Figure 5:
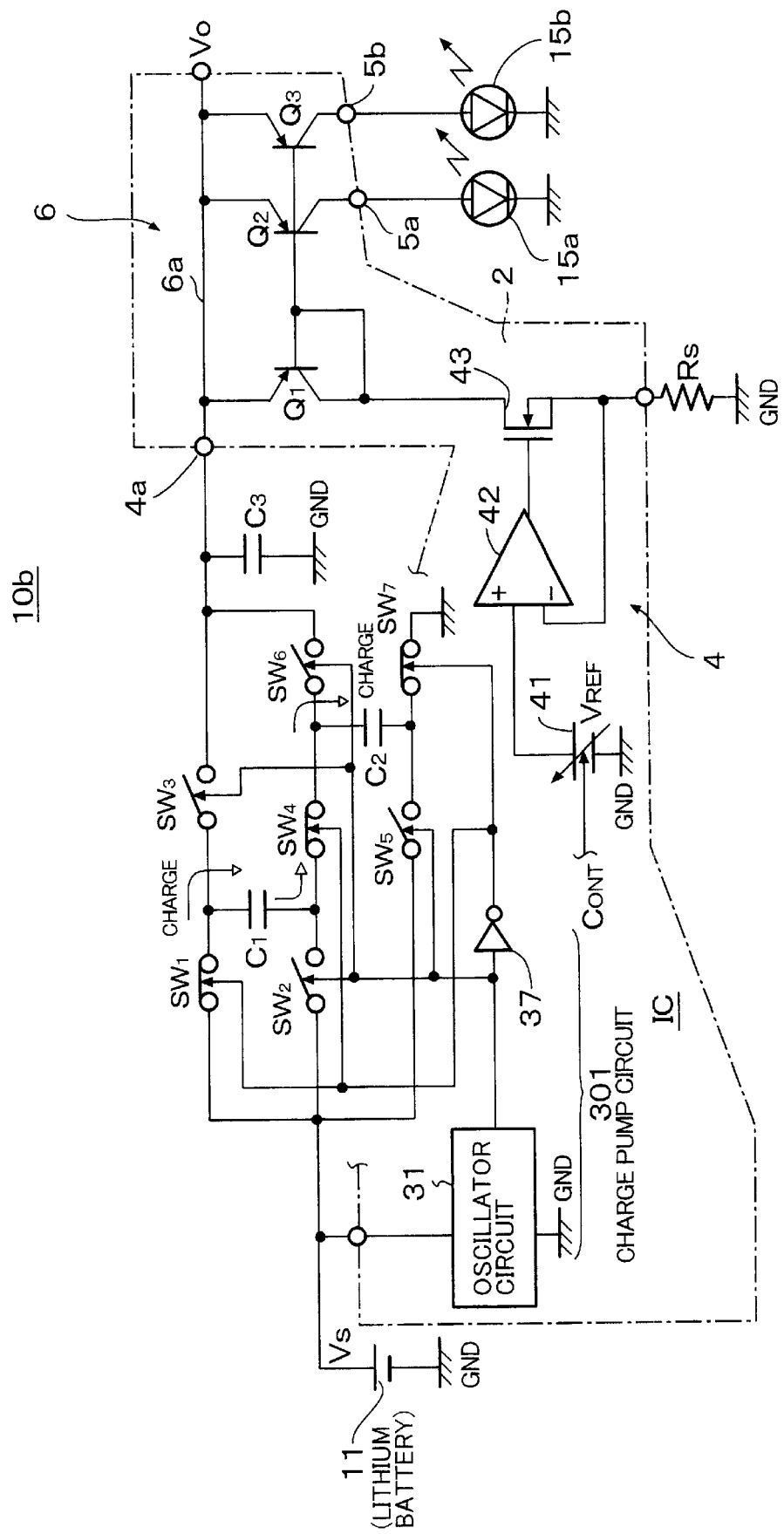
FIG. 5 is a circuit diagram of a constant current source type LED drive circuit according to another embodiment of the present invention, in which a battery voltage is boosted 1.5 times.
Figure 6:
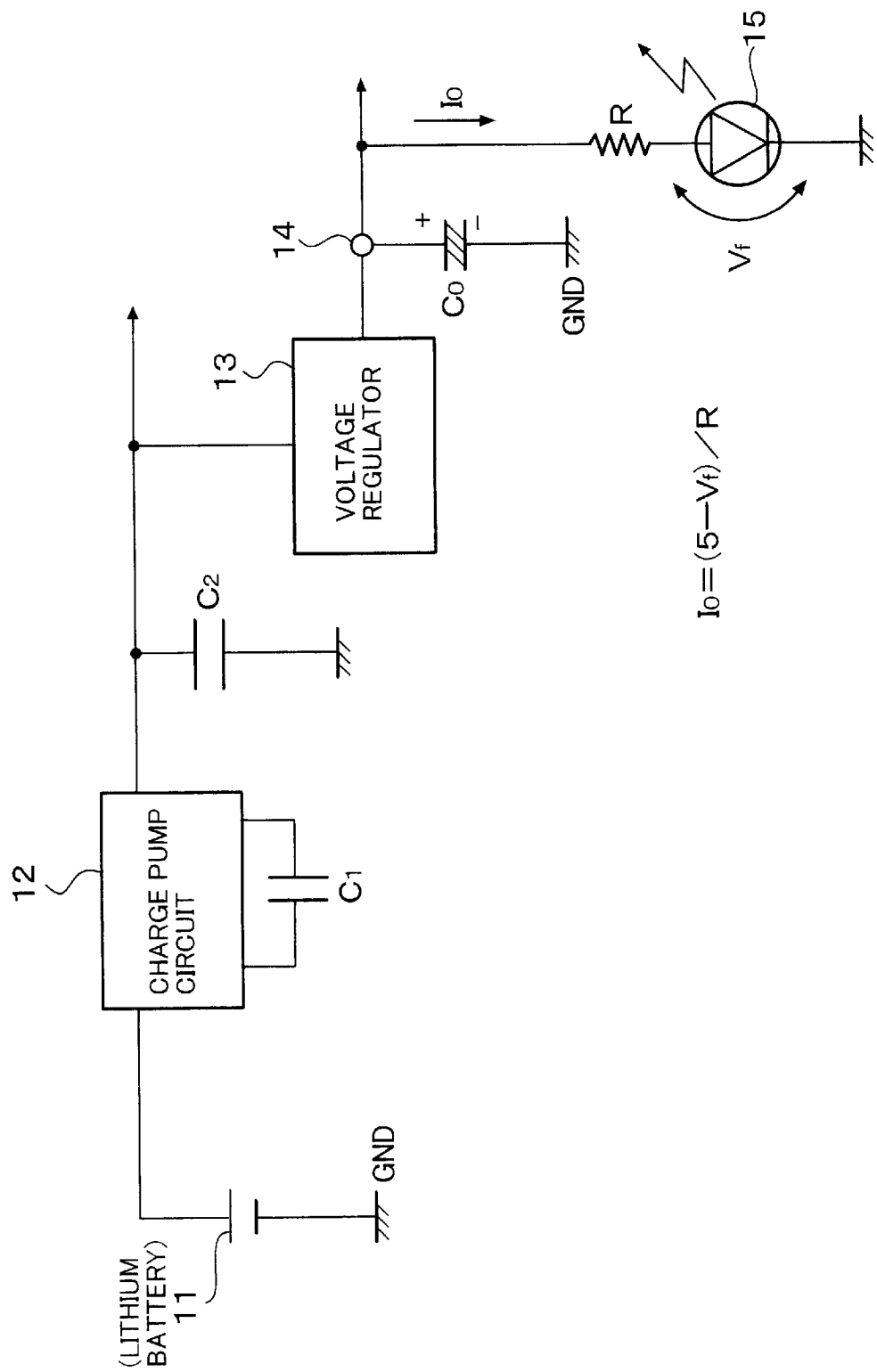
FIG. 6 is a block circuit diagram of a conventional LED drive circuit.
Figure 7A:
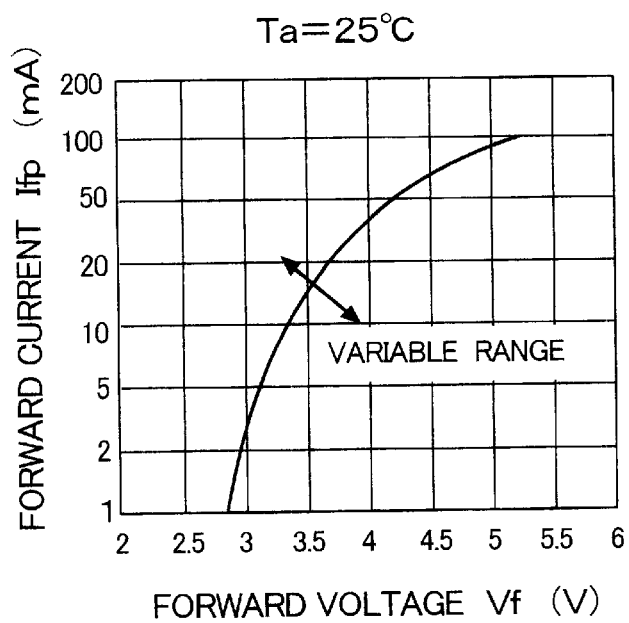
FIG. 7(a) shows a drive voltage-drive current characteristics of an LED.
Figure 7B:
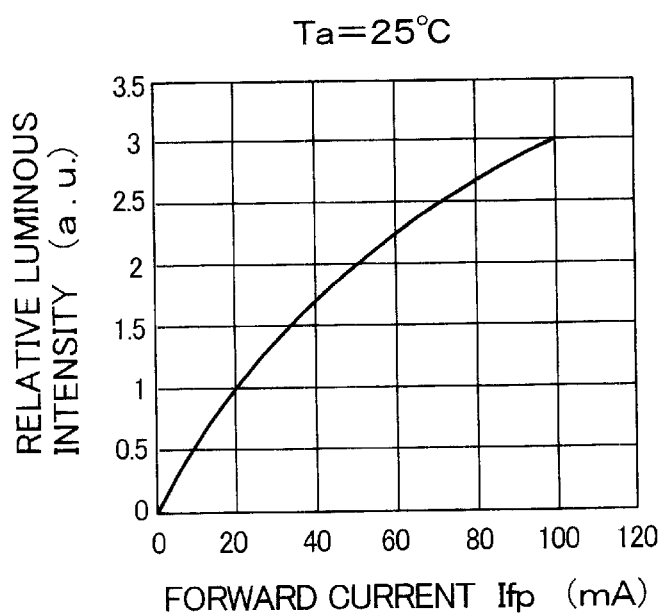
FIG. 7(b) shows a relative luminous intensity-drive current characteristics of the LED.

FIG. 5 is a circuit diagram of an LED drive circuit 10b according to a fifth embodiment of the present invention, which differs from the fourth embodiment in that, in lieu of the charge pump circuit 30 of the third embodiment, a charge pump circuit 301, which boosts the battery voltage 1.5 times. The charge pump circuit 301 includes switch circuits SW1 to SW7 and capacitors C1 to C3 as in the case of the fourth embodiment. However, these switch circuits and the capacitors are connected in different manner from that in the fourth embodiment.

When an output pulse of an oscillator circuit 31 is L, the switch circuits SW2, SW3, SW5 and SW6 are OFF and the switch circuits SW1, SW4 and SW7 are ON, so that the capacitors C1 and C2 are connected in series and charged by a lithium battery 11. In a period in which the output pulse of the oscillator circuit 31 is H, the switch circuits SW2, SW3, SW5 and SW6 are ON and the switch circuits SW1, SW4 and SW7 are OFF, so that the capacitors C1 and C2 are connected in parallel with the battery 11 and a charge thereof is transferred to the capacitor C3 causing the latter 1.5 times the battery voltage. In this case, a capacitance of the capacitor C1 is assumed as equal to that of the capacitor C2.

Thus, it is possible to further reduce power necessary for illumination and, with the described circuit construction, it is possible to light the LED with the drive voltage, which is 1.5 times the battery voltage.

Although, in this embodiment, the drive voltage of the LED's is 1.5 times the battery voltage, it is possible to generate voltage, which is 2.5 times, 3.5 times, etc., by adding n times voltage to 0.5 times voltage. By obtaining n times voltage in the series connected two capacitors and switching the series connection to a parallel connection of the two capacitors, it is possible to easily generate n/2 times voltage, where n is an integer equal to or larger than 3. Further, although two capacitors are connected in series and boosted voltage Vs/2 is obtained by changing the series connection of the capacitors to a parallel connection in the described embodiment, it is possible to obtain boosted voltage Vs/k by connecting k capacitors in series and then changing the series connection of the k capacitors to a parallel connection, where k is an integer equal to or larger than 2. Further, it is possible to obtain a boosted voltage Vs(k+1)/k by adding the battery voltage Vs thereto. Further, it is possible to add boosted nVs to this voltage. Further, it becomes possible to generate nVs(k+1)/k. From this, it is possible generally to generate n/m times voltage, where n>m and n and m are integers equal to or larger than 2.

Although the lithium battery is used as the power source in each of the described embodiments, the power source may be a ferroelectric capacitor.

What is claimed is:

1. An LED drive circuit for driving LED for illuminating a display of a portable electronic device, comprising:
   a battery power source;
   a booster circuit including first switching means for switching a power from said battery power source at a predetermined frequency, a first capacitor charged by the switched power, a second switching means, said second switching means switching complementarily to said first switching means, for boosting a voltage of said first capacitor to a boost voltage substantially n/m times the voltage of said first capacitor where n and m are integers equal to or larger than 2 and n>m, and a second capacitor charged by the boost voltage;

at least one LED connected to an output terminal of said booster circuit as a load; and a constant current circuit connected to said LED, for driving said LED with a constant current, said constant current circuit including a MOS transistor and means for generating the constant current by controlling said MOS transistor by comparing a predetermined reference voltage with a voltage according to a drive current of the LED.

2. An LED drive circuit as claimed in claim 1, wherein said constant current circuit is a current sink type constant current circuit including a current detecting resistor downstream of said MOS transistor, said current detecting resistor generates the voltage according to a drive current of the LED.

3. An LED drive circuit as claimed in claim 2, wherein the predetermined switching frequency is in a range from 100 kHz to 700 kHz.

4. An LED drive circuit as claimed in claim 3, wherein said constant current circuit regulates luminance of said LED by regulating the predetermined reference voltage by an external signal.

5. An LED drive circuit as claimed in claim 4, wherein said portable electronic device is a portable telephone set, a plurality of said LED's are provided and said booster circuit includes a charge pump circuit for charging said first capacitor and said second capacitor, said charge pump circuit operates as said first switching means and said second switching means, said charge pump circuit and said constant current circuit being integrated as an IC.

6. An LED drive circuit as claimed in claim 5, wherein said constant current circuit further includes a differential amplifier and a constant voltage generator circuit for generating the predetermined reference voltage, said differential amplifier compares the reference voltage from said constant voltage generator circuit with a terminal voltage of said current detecting resistor and supplies a current corresponding to a result of comparison to a gate of said MOS transistor.

7. An LED drive circuit as claimed in claim 6, wherein the plurality of said LED's are connected between said output terminal of said booster circuit and said constant current circuit.

8. An LED drive circuit as claimed in claim 4, further comprising a current mirror circuit including an input transistor and an output transistor, wherein said LED are connected to said output terminal of said booster circuit through said output transistor of said current mirror circuit and said input transistor of said current mirror circuit is driven by said constant current circuit.

9. An LED drive circuit as claimed in claim 5, wherein said charge pump circuit charges said second capacitor with a voltage substantially twice the battery power source voltage, generated at one end of said first capacitor by connecting the other end of said first capacitor to a positive terminal of said battery power source by said second switching means after said first capacitor is charged by supplying power to the one end thereof and grounding the other end thereof by said first switching means.

10. An LED drive circuit as claimed in claim 5, further comprising a third capacitor, wherein said charge pump circuit charges said second capacitor with a voltage substantially three times the battery power source voltage, generated at one end of a series connected said first and third capacitors by connecting the other end of said series connected said first and third capacitors to a positive terminal of said battery power source by said second switching means after a parallel said series connected said first and third capacitors are charged by supplying power to the other end thereof and grounding the one end thereof by said first switching means.

11. An LED drive circuit as claimed in claim 5, further comprising a third capacitor, wherein said charge pump circuit charges said second capacitor with a voltage substantially 1.5 times the battery power source voltage, generated at one end of a parallel connected said first and third capacitors, after a series connected said first and third capacitors are charged by supplying power to the other end thereof and grounding the one end thereof by said first switching means, by transferring charge of said first and third capacitor to said second capacitor by connecting said first and third capacitors in parallel and connecting the grounded end to a positive terminal of said battery power source by said second switching means.

* * * * *